(12) United States Patent
Li et al.

(10) Patent No.: US 11,954,654 B2
(45) Date of Patent: Apr. 9, 2024

(54) AUTOMATIC IDENTIFICATION AND CLASSIFICATION PRODUCTION LINE FOR WASTE MOBILE PHONES AND CLASSIFICATION METHOD OF WASTE MOBILE PHONES

(71) Applicant: Hefei University of Technology, Hefei (CN)

(72) Inventors: Xinyu Li, Hefei (CN); Yonggang Fu, Hefei (CN); Huaxing Yu, Hefei (CN); Wenxing Zhai, Hefei (CN); Pengshuai Bian, Hefei (CN)

(73) Assignee: Hefei University of Technology, Hefei (CN)

( * ) Notice: Subject to any disclaimer, the term of this patent is extended or adjusted under 35 U.S.C. 154(b) by 552 days.

(21) Appl. No.: 17/313,902

(22) Filed: May 6, 2021

(65) Prior Publication Data

US 2022/0067672 A1     Mar. 3, 2022

(30) Foreign Application Priority Data

Sep. 2, 2020    (CN) .......................... 202010907385.5

(51) Int. Cl.
     *G06Q 10/30*      (2023.01)
     *B07C 5/02*      (2006.01)
     (Continued)

(52) U.S. Cl.
     CPC ............... *G06Q 10/30* (2013.01); *B07C 5/02* (2013.01); *B07C 5/3422* (2013.01); *B07C 5/362* (2013.01);
     (Continued)

(58) Field of Classification Search
     CPC ........ G06V 20/41; B07C 5/02; B07C 5/3422; B07C 5/362; B65G 17/38; B65G 2201/02;
     (Continued)

(56) References Cited

FOREIGN PATENT DOCUMENTS

| CN | 110653177 A | * | 1/2020 | ............... B07C 5/02 |
| CN | 210022902 U | * | 2/2020 | |

(Continued)

*Primary Examiner* — Terrell H Matthews
(74) *Attorney, Agent, or Firm* — David R. Stevens; Stevens Law Group (57) ABSTRACT

Disclosed is an automatic identification and classification production line for waste mobile phones and a classification method of waste mobile phones. The production line comprises a feeding device, an automatic separation feeding device, a conveying chain, a data acquisition device, a computer identification device, a conveying device and a classified storage device, wherein the feeding device is used for orderly and directionally arranging and sequentially conveying a plurality of waste mobile phones; the automatic separation feeding device is used for intermittently separating the waste mobile phones conveyed by the conveying device; the conveying chain comprises an annular chain and a plurality of transparent boxes; the data acquisition device comprises a detection frame, two plane mirrors, a video camera and a light source; the computer identification device is used for extracting feature information according to front and back images of the waste mobile phones and then carrying out identification and classification.

18 Claims, 5 Drawing Sheets

(51) Int. Cl.
 *B07C 5/342* (2006.01)
 *B07C 5/36* (2006.01)
 *B65G 17/38* (2006.01)
 *G06T 7/00* (2017.01)
 *G06V 20/40* (2022.01)

(52) U.S. Cl.
 CPC ............ *B65G 17/38* (2013.01); *G06T 7/0006* (2013.01); *G06T 7/0008* (2013.01); *G06V 20/41* (2022.01); *B65G 2201/02* (2013.01); *B65G 2203/041* (2013.01); *G06T 2207/10016* (2013.01); *G06T 2207/30141* (2013.01); *G06T 2207/30164* (2013.01)

(58) Field of Classification Search
 CPC ............ B65G 2203/041; G06T 7/0006; G06T 7/0008
 USPC ........................................................ 209/509
 See application file for complete search history.

(56) References Cited

FOREIGN PATENT DOCUMENTS

| | | | | |
|---|---|---|---|---|
| CN | 211846253 U | * | 11/2020 | |
| CN | 114426199 A | * | 5/2022 | |
| CN | 110567976 B | * | 5/2023 | ......... G01N 21/8851 |

* cited by examiner

AUTOMATIC IDENTIFICATION AND CLASSIFICATION PRODUCTION LINE FOR WASTE MOBILE PHONES AND CLASSIFICATION METHOD OF WASTE MOBILE PHONES

CROSS-REFERENCE TO RELATED APPLICATION

This application claims the benefit of Chinese Application Serial No. 202010907385.5, filed Sep. 2, 2020, which is hereby incorporated herein by reference in its entirety.

TECHNICAL FIELD

The present disclosure relates to an automatic identification and classification production line for waste mobile phones in the technical field of waste mobile phone recycle, in particular to an automatic identification and classification method for waste mobile phones.

BACKGROUND

Along with rapid development of Internet technology and wide popularization of smart phones, the market scale of mobile phones is more and more huge, along with the increasingly large reserves of waste mobile phones, according to IDC statistics, more than one billion of waste mobile phones exist in China at present, only about five hundred million of mobile phones are eliminated in China in 2018, and the recovery rate of used mobile phones is less than 2%. Mobile phone recycling is a complex industry, and a traditional recycling mode is that various mobile phones are classified manually. A traditional method is low in efficiency, high in labor intensity, prone to causing secondary damage to the mobile phones and difficult to meet the recycling requirement. In particular there are the following disadvantages:

(1) the accuracy rate of mobile phone model judgment is not high due to physical condition limitation of human eyes, and secondary damage to product is extremely easy to cause;

(2) labor cost is increased year by year, recruitment is difficult, management is also difficult, and recycling cost is increased;

(3) due to limitation of factors such as conditions and environment, fatigue can be caused by long-time work, labor intensity of workers is high, efficiency is low, and mistakes are easily made; and (4) subjectivity can be brought under the influence of emotion of people, the detection effect changes along with the mood of workers, the uncertainty is increased, currently, someone uses a digital image processing technology to classify the waste mobile phones but lacks an automatic production line for efficiently processing the waste mobile phones, so that the processing efficiency is very low; some automatic production line equipment for processing waste mobile phones is complex in structure and not easy to operate, and unnecessary recycling cost is increased; some simple image features are only extracted, and the waste mobile phones are classified through simple image matching operation, so that the accuracy rate of mobile phone model judgment is not high.

SUMMARY

In order to solve the technical problem that an existing production line for recycling waste mobile phones is low in classification efficiency and inaccurate in classification, the present disclosure provides an automatic identification and classification production line for waste mobile phones and a classification method of waste mobile phones.

The present disclosure is achieved through the following technical scheme: the automatic identification and classification production line for waste mobile phones comprises:

a feeding device, used for accommodating a plurality of waste mobile phones and orderly and directionally arranging and sequentially conveying the waste mobile phones;

an automatic separation feeding device, used for intermittently separating the waste mobile phones conveyed by the conveying device;

a conveying chain, comprising an annular chain and a plurality of transparent boxes, wherein the annular chain is horizontally arranged in the annular axial direction, and the annular chain intermittently and rotationally moves; the transparent boxes are all mounted on the annular chain, and the end, away from the annular chain, of each transparent box is an open end; wherein, the waste mobile phones separated by the automatic separation feeding device intermittently fall into the transparent boxes, and each transparent box stores one waste mobile phone;

a data acquisition device, comprising a detection frame, two plane mirrors, a video camera and a light source, wherein the conveying chain passes through the detection frame; the two plane mirrors are both mounted in the detection frame and are vertical to each other; the video camera is mounted on the detection frame; the light source is mounted on the detection frame and is used for emitting light rays to the space between the two plane mirrors; and when the annular chain rotates, the transparent boxes pass through an area between the two plane mirrors, so that the front surfaces or the back surfaces of the waste mobile phones in the transparent boxes are located in a shooting area of the video camera, and the other surfaces of the waste mobile phones penetrate through the bottom of the transparent boxes, are imaged by the two plane mirrors and then appear on the same shooting surface of the video camera together with the front surfaces or the back surfaces;

a computer identification device, used for firstly extracting feature information of each waste mobile phone according to front and back images, shot by the video camera, of the waste mobile phones and then carrying out identification and classification on each waste mobile phone according to the feature information;

a conveying device, used for receiving the waste mobile phones going through the detection frame and falling off from the conveying chain and conveying the waste mobile phones in sequence; and a classified storage device, used for classifying and storing the waste mobile phones conveyed by the conveying device according to the types of the mobile phones on the basis of identification and classification results of the computer identification device.

According to the automatic identification and classification production line for waste mobile phones, different types of mixed waste mobile phones are sequentially, orderly and directionally conveyed to the next procedure through the feeding device, the waste mobile phones are further intermittently separated to the next procedure through the automatic separation feeding device, the conveying chain can load the waste mobile phones at intervals through the transparent boxes respectively, the data acquisition device enables the front surfaces or the back surfaces of the waste mobile phones located in the transparent boxes to be located in the shooting area of the video camera, the other surfaces of the waste mobile phones penetrate through the bottoms of the transparent boxes, are imaged by the two plane mirrors and then appear on the same shooting surface of the video camera together with the front surfaces or the back surfaces, so that the video camera can simultaneously acquire front and back images of the same waste mobile phone, in this way, the computer identification device can identify and classify the waste mobile phones according to the front and back images, and finally the waste mobile phones are conveyed into the classified storage device through the conveying device for classification and storage. The technical problems that an existing production line for recycling waste mobile phones is low in classification efficiency and inaccurate in classification are solved, and the technical effects of being high in classification efficiency and accurate in classification are achieved.

As further improvement of the scheme, the feeding device comprises a cylindrical hopper, a pulse electromagnet, a baffle plate, an ascending rail and a chassis; the cylindrical hopper is used for accommodating a plurality of waste mobile phones and is fixed to the top end of the chassis through a leaf spring; the pulse electromagnet is mounted at the bottom end of the cylindrical hopper and is used for driving the cylindrical hopper to generate torsion pendulum vibration in the vertical direction through the leaf spring; the ascending rail is spirally fixed to the inner wall of the cylindrical hopper, and the baffle plate is located above the ascending rail; and when the cylindrical hopper vibrates, the waste mobile phones spirally ascend along the ascending rail, and the baffle plate enables at least two stacked waste mobile phones to be scattered.

As further improvement of the scheme, the short edges of the waste mobile phones ascend to a discharge hole in the top of the cylindrical hopper in the rail direction of the ascending rail, and the short-edge lengths of the waste mobile phones are smaller than the width of the ascending rail.

As further improvement of the scheme, the automatic separation feeding device comprises a first conveying belt, a rotating rod, a cross, a connecting rod and an electric swing rod; side plates are arranged on the two opposite sides of the first conveying belt, a separation channel is formed between the two side plates, the width of the separation channel is larger than the wide-edge lengths of the waste mobile phones, and the separation channel is used for receiving the waste mobile phones discharged from the discharge hole; a first strip-shaped hole and a second strip-shaped hole which are located on the same horizontal plane and separated from each other are formed in one of the side plates; the rotating rod is located on one side of the first strip-shaped hole, and four circular bayonets located on the same circumference at equal intervals are formed in the side wall of the rotating rod; the cross is mounted on the rotating rod, and four ends of the cross can sequentially pass through the first strip-shaped hole when the rotating rod rotates; the electric swing rod is L-shaped, one end of the electric swing rod passes through the second strip-shaped hole, and the other end of the electric swing rod serves as a rotation driving end; one end of the connecting rod is connected to the swing section of the electric swing rod; when one end of the electric swing rod is vertical to the separation channel, the connecting rod can abut against one circular bayonet, so that the rotating rod cannot rotate; when the swing section of the electric swing rod swings in the direction away from the rotating rod, the connecting rod is disengaged from the rotating rod, and the rotating rod and the cross rotate by 90 degrees under the pushing effect of the waste mobile phones, so that the other circular bayonet is aligned with the connecting rod.

As further improvement of the scheme, the data acquisition device further comprises an acquisition frame and a camera; the separation channel passes through the acquisition frame, and the acquisition frame is located between the cross and the electric swing rod; the camera is mounted on the acquisition frame and is used for shooting the waste mobile phones located on the separation channel; and the computer identification device is used for acquiring the size information of the corresponding waste mobile phone according to a mobile phone image shot by the camera.

As further improvement of the scheme, the conveying chain further comprises a plurality of groups of supporting columns corresponding to the transparent boxes respectively; the annular chain is provided with a plurality of mounting bases corresponding to the multiple groups of supporting columns respectively; the same end of each group of supporting columns is fixed to the corresponding mounting base, and the same other end of each group of supporting columns is connected with the corresponding transparent box; and wherein, when each transparent box passes through the area between the two plane mirrors, the contact faces of the corresponding supporting columns and the corresponding mounting bases are close to the ends, close to each other, of the two plane mirrors.

As further improvement of the scheme, the conveying device comprises a second conveying belt, two guide plates, a conveying plate and two limiting plates; the second conveying belt is horizontally arranged, and one end of the second conveying belt is used for receiving the waste mobile phones falling off from the conveying chain; the two guide plates are mounted above the conveying belt and form a narrowing channel from one end of the second conveying belt to the other end of the second conveying belt; the conveying plate is used for receiving the waste mobile phones falling off from the narrowing channel and conveying the waste mobile phones to the classified storage device; and the two limiting plates are mounted on the two opposite sides of the conveying plate respectively, and the distance between the two limiting plates is smaller than the long-edge lengths of the waste mobile phones and larger than the short-edge lengths of the waste mobile phones.

As further improvement of the scheme, the classified storage device comprises a rotation driving mechanism, a rotating cylinder, a plurality of storage boxes, a plurality of transverse rods corresponding to the storage boxes respectively, a plurality of telescopic rods corresponding to the transverse rods respectively and a plurality of storage tanks; the rotation driving mechanism is used for driving the rotating cylinder to rotate; the transverse rods are distributed at equal intervals, the same ends of the transverse rods are movably mounted on the side wall of the rotating cylinder, and the other ends of the transverse rods are connected with the storage boxes respectively; the top end of each storage box is an open end, and a notch is formed in the side, facing the corresponding storage box, of each material storage box; the bottom end of the conveying plate faces the opening end of one of the storage boxes, and the storage boxes are used for receiving the waste mobile phones falling off from the conveying plate; the classified storage device firstly drives the rotating cylinder to rotate by a preset angle through the rotation driving mechanism according to the identification and classification results, so that the storage boxes are located above the storage tanks corresponding to the waste mobile phones, and then the telescopic rods are driven to retract, so that the notches face the storage tanks, and finally, after the waste mobile phones fall into the storage tanks, the telescopic rods are driven to stretch out, so that all storage boxes are located on the same horizontal plane.

As further improvement of the scheme, the number of the storage tanks is the same as that of the storage boxes; the classified storage device further comprises a plurality of counting sensors corresponding to the storage tanks respectively; and each counting sensor is mounted on the inner wall of the corresponding storage tank and is used for counting the waste mobile phones entering the corresponding storage tank.

The present disclosure provides an automatic identification and classification method for waste mobile phones, applied to an automatic identification and classification production line for waste mobile phones according to any claim, comprising the following steps:

when the annular chain rotates, enabling each transparent box to pass through an area between the two plane mirrors, so that the front surfaces or the back surfaces of the waste mobile phones in the transparent boxes are located in a shooting area of the video camera, and enabling the other surfaces of the waste mobile phones to penetrate through the bottom of the transparent boxes, to be imaged by the two plane mirrors and then to appear on the same shooting surface of the video camera together with the front surfaces or the back surfaces;

firstly extracting feature information of each waste mobile phone according to front and back images, shot by the video camera, of the waste mobile phones and then carrying out identification and classification on each waste mobile phone according to the feature information; and classifying and storing the waste mobile phones conveyed by the conveying device according to the types of the mobile phones on the basis of identification and classification results of the computer identification device.

Compared with an existing production line for recycling waste mobile phones, the automatic identification and classification production line for waste mobile phones and the classification method of the waste mobile phones have the following beneficial effects:

Firstly, according to the automatic identification and classification production line for waste mobile phones, different types of mixed waste mobile phones are sequentially, orderly and directionally conveyed to the next procedure through the feeding device, the waste mobile phones are further intermittently separated to the next procedure through the automatic separation feeding device, the conveying chain can load the waste mobile phones at intervals through the transparent boxes respectively, the data acquisition device enables the front surfaces or the back surfaces of the waste mobile phones located in the transparent boxes to be located in the shooting area of the video camera, the other surfaces of the waste mobile phones penetrate through the bottoms of the transparent boxes, are imaged by the two plane mirrors and then appear on the same shooting surface of the video camera together with the front surfaces or the back surfaces, so that the video camera can simultaneously acquire front and back images of the same waste mobile phone, in this way, the computer identification device can identify and classify the waste mobile phones according to the front and back images, and finally the waste mobile phones are conveyed into the classified storage device through the conveying device for classification and storage.

Since the front and back images of the same waste mobile phone can be obtained simultaneously in the classification process, so that the production efficiency and the identification accuracy can be greatly improved, and the classification accuracy is ensured.

Secondly, according to the automatic identification and classification production line for waste mobile phones, the waste mobile phones of different models and sizes can be automatically identified and classified, full automation is realized in the identification process, the identification accuracy is high, the problems that the accuracy rate cannot be ensured and the identification efficiency is low due to manual identification are avoided, the production efficiency and the accuracy rate are greatly improved, the production line equipment is simple in structure, the cost is saved, and the working complexity is reduced.

Thirdly, according to the automatic identification and classification production line for waste mobile phones, the feeding device enables the short edges of the waste mobile phones to ascend towards a spiral rail, so that the waste mobile phones which are disordered and stacked together can be automatically, orderly and directionally arranged in order and accurately conveyed to the next procedure, and subsequent processing of the waste mobile phones is facilitated. Moreover, a computer system can identify the models of the mobile phones in combination with the size obtained in the transportation process of the mobile phones and the extracted feature information of the front surfaces and the back surfaces of the mobile phones, so that the identification accuracy can be improved.

Fourthly, according to the automatic identification and classification production line for waste mobile phones, the automatic separation feeding device comprises a first conveying belt, a rotating rod, a cross, a connecting rod and an electric swing rod. According to the automatic separation feeding device, the electric swing rod is used for driving the connecting rod to control the rotating rod, that is, when the electric swing rod swings once, the rotating rod can rotate by 90 degrees to enable one waste mobile phone to pass through, so that an intermittent separation function is achieved, the rear waste mobile phones are blocked in front of the rotating rod which just rotates by 90 degrees, the operation is cycled in this way, and the waste mobile phones are controlled to intermittently reach the conveying chain which moves intermittently.

Fifthly, according to the automatic identification and classification production line for waste mobile phones, the conveying device comprises a second conveying belt, two guide plates, a conveying plate and two limiting plates. The conveying device goes through the two guide plates to form a narrowing channel, so that the waste mobile phones can be changed from an incorrect conveying direction into a direction in which the short edges move forwards, and the subsequent waste mobile phones can fall into the storage boxes conveniently.

Sixthly, according to the automatic identification and classification production line for waste mobile phones, the classified storage device comprises a rotation driving mechanism, a rotating cylinder, a plurality of storage boxes, a plurality of transverse rods, a plurality of telescopic rods and a plurality of storage tanks. According to the classified storage device, the storage boxes are moved to the positions above the storage boxes needing to place materials through rotation of the rotating cylinder, then the storage boxes are inclined through the telescopic rods, in this way, the waste mobile phones can automatically slide down under the action of gravity to be transferred into the storage boxes, finally, the storage boxes are returned to original positions through the telescopic rods, and then the storage boxes can act in a rotating manner, so that the maximum efficiency of material classification can be realized at a relatively small rotation angle, and the classification efficiency and the classification accuracy of the waste mobile phones are improved.

Seventhly, according to an automatic identification and classification method for waste mobile phones, the beneficial effects of the automatic identification and classification method for waste mobile phones are the same as those of the automatic identification and classification production line for waste mobile phones, and unnecessary details are not given herein.

Reference signs in drawings:
1, feeding device; 2, conveying chain; 3, conveying device; 4, classified storage device; 5, computer identification device; 6, automatic separation feeding device; 7, camera; 8, data acquisition device;
11, cylindrical hopper; 12, baffle plate; 13, ascending rail; 14, chassis;
21, transparent box; 22, cover plate; 23, annular chain;
31, guide plate; 32, conveying plate; 33, limiting plate;
41, storage box; 42, transverse rod; 43, telescopic rod; 44, storage tank; 45, counting sensor;
61, circular bayonet; 62, electric swing rod; 63, connecting rod; 64, rotating rod;
81, plane mirror; 82, video camera; 83, light source; and 84, detection frame.

DETAILED DESCRIPTION

In order to make the objectives, technical solutions and advantages of the present disclosure clearer, the present disclosure will be further described hereinbelow with reference to the attached figures and embodiments thereof. It shall be understood that, the embodiments described herein are only intended to illustrate but not to limit the present disclosure.

Embodiment I

Referring to FIG. 1 to FIG. 7, the embodiment of the present disclosure provides an automatic identification and classification production line for waste mobile phones, and the production line is used for classifying and storing various waste mobile phones with different sizes and different types. In the embodiment, the production line comprises a feeding device 1, an automatic separation feeding device 6, a conveying chain 2, a data acquisition device 8, a computer identification device 5, a conveying device 3 and a classified storage device 4. The devices can be combined, for example, the automatic separation feeding device 6, the conveying chain 2 and the conveying device 3 are combined into a material transferring subsystem, and meanwhile the feeding device 1 can also be referred to as a discharging device.

Figure 2:
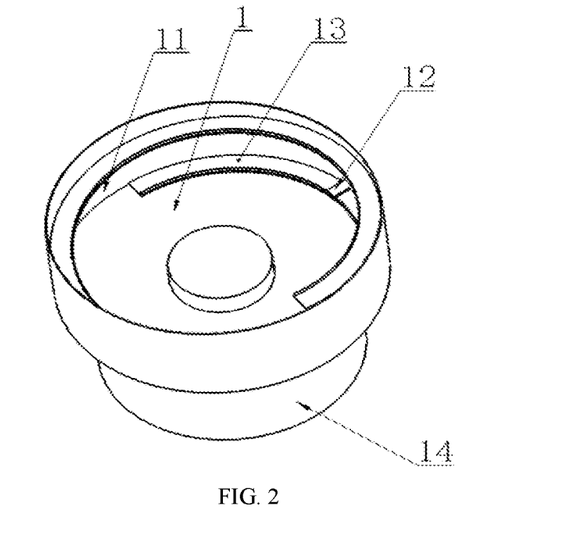
FIG. 2 is a structural schematic diagram of a feeding device of the automatic identification and classification production line for waste mobile phones in FIG. 1.

Referring to FIG. 2, the feeding device 1 is used for accommodating a plurality of waste mobile phones and orderly and directionally arranging and sequentially conveying the waste mobile phones. In the embodiment, the feeding device 1 comprises a cylindrical hopper 11, a pulse electromagnet, a baffle plate 12, an ascending rail 13 and a chassis 14. The cylindrical hopper 11 is used for accommodating a plurality of waste mobile phones and is fixed to the top end of the chassis 14 through a leaf spring. The pulse electromagnet is mounted at the bottom end of the cylindrical hopper 11 and is used for driving the cylindrical hopper 11 to generate torsion pendulum vibration in the vertical direction through the leaf spring. The ascending rail 13 is spirally fixed to the inner wall of the cylindrical hopper 11, and the baffle plate 12 is located above the ascending rail 13. When the cylindrical hopper 11 vibrates, the waste mobile phones spirally ascend along the ascending rail 13, and the baffle plate 12 enables at least two stacked waste mobile phones to be scattered. Wherein, the short edges of the waste mobile phones ascend to a discharge hole in the top of the cylindrical hopper 11 in the rail direction of the ascending rail 13, and the short-edge lengths of the waste mobile phones are smaller than the width of the ascending rail 13.

Figure 3:
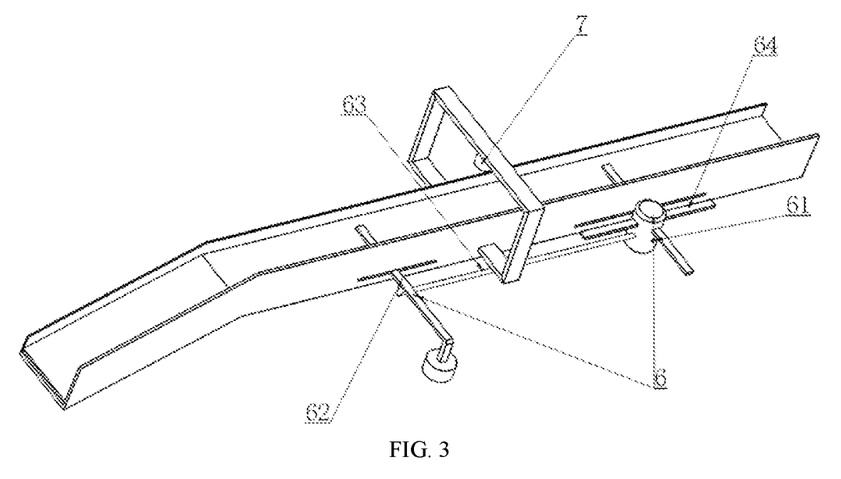
FIG. 3 is a structural schematic diagram of an automatic separation feeding device of the automatic identification and classification production line for waste mobile phones in FIG. 1.

Referring to FIG. 3, the automatic separation feeding device 6 is used for intermittently separating the waste mobile phones conveyed by the conveying device 1. In the embodiment, the automatic separation feeding device 6 comprises a first conveying belt, a rotating rod 64, a cross, a connecting rod 63 and an electric swing rod 62. Side plates are arranged on the two opposite sides of the first conveying belt, a separation channel is formed between the two side plates, the width of the separation channel is larger than the wide-edge lengths of the waste mobile phones, and the separation channel is used for receiving the waste mobile phones discharged from the discharge hole. A first strip-shaped hole and a second strip-shaped hole which are located on the same horizontal plane and separated from each other are formed in one of the side plates. The rotating rod 64 is located on one side of the first strip-shaped hole, and four circular bayonets 61 located on the same circumference at equal intervals are formed in the side wall of the rotating rod. The cross is mounted on the rotating rod 64, and four ends of the cross can sequentially pass through the first strip-shaped hole when the rotating rod 64 rotates. The electric swing rod 62 is L-shaped, one end of the electric swing rod passes through the second strip-shaped hole, and the other end of the electric swing rod serves as a rotation driving end. One end of the connecting rod 63 is connected to the swing section of the electric swing rod 62. When one end of the electric swing rod 62 is vertical to the separation channel, the connecting rod 63 can abut against one circular bayonet 61, so that the rotating rod 64 cannot rotate. When the swing section of the electric swing rod 62 swings in the direction away from the rotating rod 64, the connecting rod 63 is disengaged from the rotating rod 64, and the rotating rod 64 and the cross rotate by 90 degrees under the pushing effect of the waste mobile phones, so that the other circular bayonet 61 is aligned with the connecting rod 63.

Figure 4:
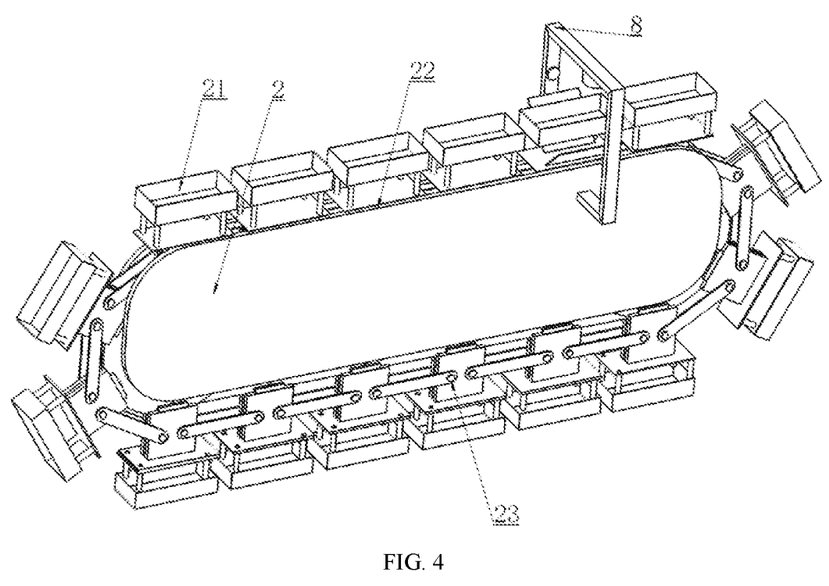
FIG. 4 is a structural schematic diagram of a conveying chain of the automatic identification and classification production line for waste mobile phones in FIG. 1.

Referring to FIG. 4, the conveying chain 2 comprises a cover plate 22, an annular chain 23 and a plurality of transparent boxes 21, and further can comprise a plurality of groups of supporting columns. The annular chain 23 is horizontally arranged in the annular axial direction, and the annular chain 23 intermittently and rotationally moves around the cover plate 22. The transparent boxes 21 are all mounted on the annular chain 23, and the end, away from the annular chain 23, of each transparent box is an open end. Wherein, the waste mobile phones separated by the automatic separation feeding device 6 intermittently fall into the transparent boxes 21, and each transparent box 21 stores one waste mobile phone. In the embodiment, the multiple groups of supporting columns correspond to the transparent boxes 21 respectively. The annular chain 23 is provided with a plurality of mounting bases corresponding to the multiple groups of supporting columns respectively. The same end of each group of supporting columns is fixed to the corresponding mounting base, and the same other end of each group of supporting columns is connected with the corresponding transparent box 21. Wherein, when each transparent box 21 passes through the area between the two plane mirrors 81, the contact faces of the corresponding supporting columns and the corresponding mounting bases are close to the ends, close to each other, of the two plane mirrors 81.

Figure 5:
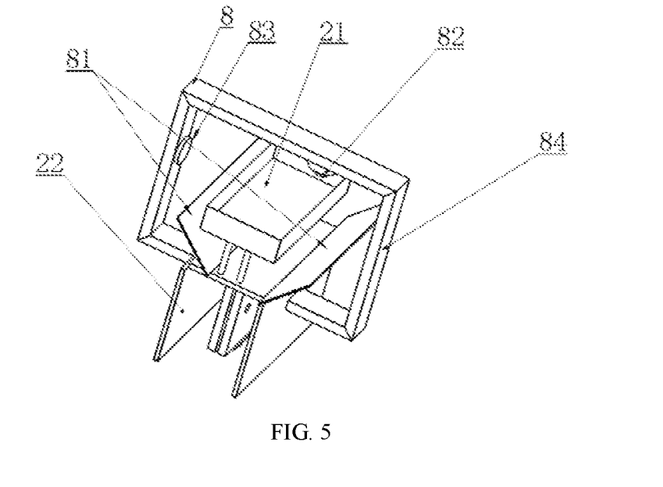
FIG. 5 is a structural schematic diagram of a data acquisition device of the automatic identification and classification production line for waste mobile phones in FIG. 1.

In the embodiment, the transparent boxes 21 on the conveying chain 2 are not located on the angular bisector of the two plane mirrors 81 vertical to each other, but deviates by a certain angle, and the industrial video camera 82 and the light source 83 are fixed to a detection support. When the transparent boxes 21 accommodating waste mobile phones pass through two plane mirrors 81 which are vertical to each other, due to the principle of optics, the surfaces, making contact with the bottom surfaces of the transparent boxes 21, of the mobile phones penetrate through the transparent boxes 21 and then are imaged through the two plane mirrors 81, and the front surfaces and the back surfaces of the waste mobile phones can appear on the same horizontal plane at the same time and then pass through the industrial video camera 82 above, and then front and back images of the mobile phones can be obtained at the same time and then transmitted to a computer to obtain the feature information of the mobile phones for mobile phone recognition and classification.

Referring to FIG. 5, the data acquisition device 8 comprises a detection frame 84, two plane mirrors 82, a video camera 82 and a light source 83, and further can comprise an acquisition frame and a camera 7. The conveying chain 2 passes through the detection frame 84. The two plane mirrors 81 are both mounted in the detection frame 84 and are vertical to each other. The video camera 82 is mounted on the detection frame 84. The light source 83 is mounted on the detection frame 84 and is used for emitting light rays to the space between the two plane mirrors 81. When the annular chain 23 rotates, each transparent box 21 passes through an area between the two plane mirrors 81, so that the front surfaces or the back surfaces of the waste mobile phones in the transparent boxes 21 are located in a shooting area of the video camera 82, and the other surfaces of the waste mobile phones penetrate through the bottom of the transparent boxes 21, are imaged by the two plane mirrors 81 and then appear on the same shooting surface of the video camera 82 together with the front surfaces or the back surfaces. The separation channel passes through the acquisition frame, and the acquisition frame is located between the cross and the electric swing rod 62. The camera 7 is mounted on the acquisition frame and is used for shooting the waste mobile phones located on the separation channel.

The computer identification device 5 is used for firstly extracting feature information of each waste mobile phone according to front and back images, shot by the video camera 82, of the waste mobile phones and then carrying out identification and classification on each waste mobile phone according to the feature information. The computer identification device 5 is used for acquiring the size information of the corresponding waste mobile phone according to a mobile phone image shot by the camera 7. Therefore, a computer system can identify the models of the mobile phones in combination with the size obtained in the transportation process of the mobile phones and the extracted feature information of the front surfaces and the back surfaces of the mobile phones, so that the identification accuracy can be improved.

Figure 6:
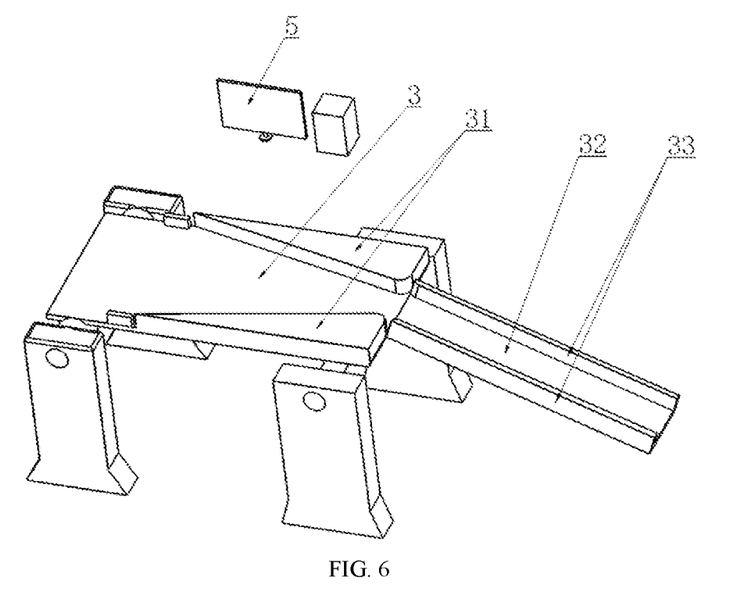
FIG. 6 is a structural schematic diagram of a conveying device of the automatic identification and classification production line for waste mobile phones in FIG. 1.

Referring to FIG. 6, the conveying device 3 is used for receiving the waste mobile phones going through the detection frame 84 and falling off from the conveying chain 2 and conveying the waste mobile phones in sequence. In the embodiment, the conveying device 3 comprises a second conveying belt, two guide plates 31, a conveying plate 32 and two limiting plates 33. The second conveying belt is horizontally arranged, and one end of the second conveying belt is used for receiving the waste mobile phones falling off from the conveying chain 2. The two guide plates 31 are mounted above the conveying belt and form a narrowing channel from one end of the second conveying belt to the other end of the second conveying belt. The conveying plate 32 is used for receiving the waste mobile phones falling off from the narrowing channel and conveying the waste mobile phones to the classified storage device 4. The two limiting plates 33 are mounted on the two opposite sides of the conveying plate 32 respectively, and the distance between the two limiting plates 33 is smaller than the long-edge lengths of the waste mobile phones and larger than the short-edge lengths of the waste mobile phones.

Figure 7:
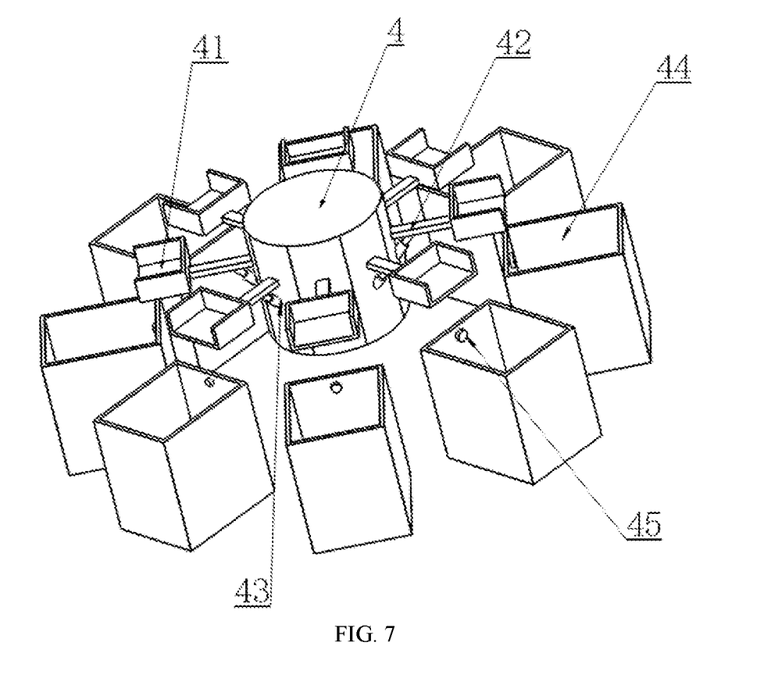
FIG. 7 is a structural schematic diagram of a classified storage device of the automatic identification and classification production line for waste mobile phones in FIG. 1.

Referring to FIG. 7, the classified storage device 4 is used for classifying and storing the waste mobile phones conveyed by the conveying device 3 according to the types of the mobile phones on the basis of identification and classification results of the computer identification device 5. In the embodiment, the classified storage device 4 comprises a rotation driving mechanism, a rotating cylinder, a plurality of storage boxes 41, a plurality of transverse rods 42 corresponding to the storage boxes 41 respectively, a plurality of telescopic rods 43 corresponding to the transverse rods 42 respectively and a plurality of storage tanks 44. The rotation driving mechanism is used for driving the rotating cylinder to rotate. The transverse rods 42 are distributed at equal intervals, the same ends of the transverse rods are movably mounted on the side wall of the rotating cylinder, and the other ends of the transverse rods are connected with the storage boxes 41 respectively. The top end of each storage box 41 is an open end, and a notch is formed in the side, facing the corresponding storage box 44, of each material storage box 41. The storage boxes 41 and the storage tanks 44 are arranged in the circumferential direction of the rotating cylinder, and the storage boxes 41 can rotate by 360 degrees. The bottom end of the conveying plate 32 faces the opening end of one of the storage boxes 41, and the storage boxes 41 are used for receiving the waste mobile phones falling off from the conveying plate 32.

The classified storage device 4 firstly drives the rotating cylinder to rotate by a preset angle through the rotation driving mechanism according to the identification and classification results, so that the storage boxes 41 are located above the storage tanks 44 corresponding to the waste mobile phones, and then the telescopic rods 43 are driven to retract, so that the notches face the storage tanks 44, and finally, after the waste mobile phones fall into the storage tanks 44, the telescopic rods 43 are driven to stretch out, so that all storage boxes 41 are located on the same horizontal plane. Wherein, the number of the storage tanks 44 is the same as that of the storage boxes 41. The classified storage device 4 further comprises a plurality of counting sensors 45 corresponding to the storage tanks 44 respectively. Each counting sensor 45 is mounted on the inner wall of the corresponding storage tank 44 and is used for counting the waste mobile phones entering the corresponding storage tank 44. The telescopic rods 43 can control the transverse rods connected with the storage boxes 41 and the cylinder to swing up and down, so that the mobile phones in the storage boxes 41 fall into the storage boxes 44, and correct classification of the mobile phones is achieved. The counting sensors 45 are mounted at box openings of the storage boxes 44 and are used for counting the number of the mobile phones in the storage boxes 44, and when the number reaches a certain number, the storage boxes 44 are replaced to continue to store the classified waste mobile phones.

Figure 1:
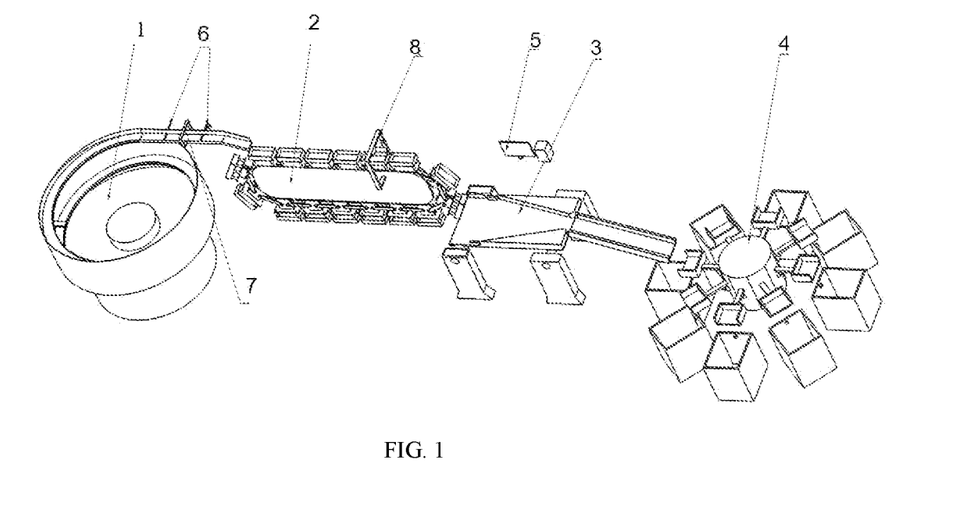
FIG. 1 is a solid structural schematic diagram of an automatic identification and classification production line for waste mobile phones in Embodiment I of the present disclosure.

In conclusion, compared with the existing production line for recycling waste mobile phones, the automatic identification and classification production line for waste mobile phones in the embodiment has the following advantages:

Firstly, according to the automatic identification and classification production line for waste mobile phones, different types of mixed waste mobile phones are sequentially, orderly and directionally conveyed to the next procedure through the feeding device 1, the waste mobile phones are further intermittently separated to the next procedure through the automatic separation feeding device 6, the conveying chain 2 can load the waste mobile phones at intervals through the transparent boxes 21 respectively, the data acquisition device 8 enables the front surfaces or the back surfaces of the waste mobile phones located in the transparent boxes 21 to be located in the shooting area of the video camera 82, the other surfaces of the waste mobile phones penetrate through the bottoms of the transparent boxes 21, are imaged by the two plane mirrors 81 and then appear on the same shooting surface of the video camera 82 together with the front surfaces or the back surfaces, so that the video camera 82 can simultaneously acquire front and back images of the same waste mobile phone, in this way, the computer identification device 5 can identify and classify the waste mobile phones according to the front and back images, and finally the waste mobile phones are conveyed into the classified storage device 4 through the conveying device 3 for classification and storage. Since the front and back images of the same waste mobile phone can be obtained simultaneously in the classification process, so that the production efficiency and the identification accuracy can be greatly improved, and the classification accuracy is ensured.

Secondly, according to the automatic identification and classification production line for waste mobile phones, the waste mobile phones of different models and sizes can be automatically identified and classified, full automation is realized in the identification process, the identification accuracy is high, the problems that the accuracy rate cannot be ensured and the identification efficiency is low due to manual identification are avoided, the production efficiency and the accuracy rate are greatly improved, the production line equipment is simple in structure, the cost is saved, and the working complexity is reduced.

Thirdly, according to the automatic identification and classification production line for waste mobile phones, the feeding device 1 enables the short edges of the waste mobile phones to ascend towards a spiral rail, so that the waste mobile phones which are disordered and stacked together can be automatically, orderly and directionally arranged in order and accurately conveyed to the next procedure, and subsequent processing of the waste mobile phones is facilitated. Moreover, a computer system can identify the models of the mobile phones in combination with the size obtained in the transportation process of the mobile phones and the extracted feature information of the front surfaces and the back surfaces of the mobile phones, so that the identification accuracy can be improved.

Fourthly, according to the automatic identification and classification production line for waste mobile phones, the automatic separation feeding device 6 comprises a first conveying belt, a rotating rod 64, a cross, a connecting rod 63 and an electric swing rod 62. According to the automatic separation feeding device 6, the electric swing rod 62 is used for driving the connecting rod 63 to control the rotating rod 64, that is, when the electric swing rod 62 swings once, the rotating rod 64 can rotate by 90 degrees to enable one waste mobile phone to pass through, so that an intermittent separation function is achieved, the rear waste mobile phones are blocked in front of the rotating rod 64 which just rotates by 90 degrees, the operation is cycled in this way, and the waste mobile phones are controlled to intermittently reach the conveying chain 2 which moves intermittently.

Fifthly, according to the automatic identification and classification production line for waste mobile phones, the conveying device 3 comprises a second conveying belt, two guide plates 31, a conveying plate 32 and two limiting plates 33. The conveying device 3 goes through the two guide plates 31 to form a narrowing channel, so that the waste mobile phones can be changed from an incorrect conveying direction into a direction in which the short edges move forwards, and the subsequent waste mobile phones can fall into the storage boxes 41 conveniently.

Sixthly, according to the automatic identification and classification production line for waste mobile phones, the classified storage device 4 comprises a rotation driving mechanism, a rotating cylinder, a plurality of storage boxes 41, a plurality of transverse rods 42, a plurality of telescopic rods 43 and a plurality of storage tanks 44. According to the classified storage device 4, the storage boxes 41 are moved to the positions above the storage boxes 44 needing to place materials through rotation of the rotating cylinder, then the storage boxes 43 are inclined through the telescopic rods 41, in this way, the waste mobile phones can automatically slide down under the action of gravity to be transferred into the storage boxes 44, finally, the storage boxes 41 are returned to original positions through the telescopic rods 43, and then the storage boxes 41 can act in a rotating manner, so that the maximum efficiency of material classification can be realized at a relatively small rotation angle, and the classification efficiency and the classification accuracy of the waste mobile phones are improved.

Embodiment II

The embodiment provides an automatic identification and classification production line for waste mobile phones, which is similar to the production line in Embodiment I and has the difference that the pulse electromagnet is replaced by a vibration motor. When the vibration motor works, force with the directional frequency is generated to serve as power of a vibration disc, disordered and stacked mobile phones are automatically, orderly and directionally arranged in order and accurately conveyed to the next procedure, and therefore feeding is achieved.

Embodiment III

The embodiment provides an automatic identification and classification production line for waste mobile phones, and the specific working process of the computer identification device 5 is added on the basis of Embodiment I. The computer identification device 5 firstly carries out image standardization processing on the front and back images, extracts the images on the front surfaces and the back surfaces of the waste mobile phones in the images, then carries out graying processing on the images on the front surfaces and the back surfaces, enables lines in the grayed images to be clearer by increasing the contrast and the brightness, or vice versa, and then extracts contour features; and meanwhile, partitioning is carried out, line features in each block are extracted, finally, all features are compared with features in a preset feature library to find a mobile phone model with the maximum feature similarity, and the models of the mobile phones corresponding to the mobile phone models are taken as identification and classification information of the waste mobile phones to be classified. According to the embodiment, the front and back sides of the waste mobile phones are subjected to feature extraction, so that the final identification result is more accurate, and especially when the front information or back information of some mobile phones is insufficient, the front and back side identification can greatly improve the recognition passing rate and the classification accuracy.

Embodiment IV

The embodiment provides an automatic identification and classification method for waste mobile phones. The method is applied to any automatic identification and classification production line for waste mobile phones provided in embodiments I to III. Wherein, the automatic identification and classification method comprises the following steps:
(1) when the annular chain 23 rotates, enabling each transparent box 21 to pass through an area between the two plane mirrors 81, so that the front surfaces or the back surfaces of the waste mobile phones in the transparent boxes 21 are located in a shooting area of the video camera 82, and enabling the other surfaces of the waste mobile phones to penetrate through the bottom of the transparent boxes 21, to be imaged by the two plane mirrors 81 and then to appear on the same shooting surface of the video camera 82 together with the front surfaces or the back surfaces;
(2) firstly extracting feature information of each waste mobile phone according to front and back images, shot by the video camera 82, of the waste mobile phones and then carrying out identification and classification on each waste mobile phone according to the feature information; and
(3) classifying and storing the waste mobile phones conveyed by the conveying device 3 according to the types of the mobile phones on the basis of identification and classification results of the computer identification device 5.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

The invention claimed is:
1. An automatic identification and classification production line for waste mobile phones, comprising:
a feeding device configured to accommodate a plurality of waste mobile phones and to orderly and directionally arrange and sequentially convey the waste mobile phones;
an automatic separation feeding device configured to intermittently separate the waste mobile phones conveyed by the conveying device;
a conveying chain, comprising an annular chain and a plurality of transparent boxes, wherein the annular chain is horizontally arranged in the annular axial direction, and the annular chain is configured to intermittently and rotationally move;
the transparent boxes all mounted on the annular chain, and the end, away from the annular chain, of each transparent box is an open end;
wherein the automatic separation feeding device is configured such that the waste mobile phones separated by the automatic separation feeding device intermittently fall into the transparent boxes, and each transparent box stores one waste mobile phone;
a data acquisition device, comprising a detection frame, two plane mirrors, a video camera and a light source, wherein the conveying chain passes through the detection frame;
the two plane mirrors are both mounted in the detection frame and are vertical to each other;
the video camera is mounted on the detection frame;
the light source is mounted on the detection frame and is configured to emit light rays to the space between the two plane mirrors; and
the annular chain and the transparent boxes are configured such that when the annular chain rotates, each transparent box passes through an area between the two plane mirrors, so that the front surfaces or the back surfaces of the waste mobile phones in the transparent boxes are located in a shooting area of the video camera, and the other surfaces of the waste mobile phones visible through the bottom of the transparent boxes, are imaged by the two plane mirrors and then appear on the same shooting surface of the video camera together with the front surfaces or the back surfaces;
a computer identification device configured to firstly extract feature information of each waste mobile phone according to front and back images, shot by the video camera, of the waste mobile phones and then carry out identification and classification on each waste mobile phone according to the feature information;
a conveying device configured to receive the waste mobile phones going through the detection frame and falling off from the conveying chain and convey the waste mobile phones in sequence; and
a classified storage device configured to classify and store the waste mobile phones conveyed by the conveying device according to the types of the mobile phones on the basis of identification and classification results of the computer identification device.

2. The automatic identification and classification production line for waste mobile phones according to claim 1, wherein the feeding device comprises:
   a cylindrical hopper, a pulse electromagnet, a baffle plate, an ascending rail and a chassis;
   the cylindrical hopper is configured to be used for accommodating a plurality of waste mobile phones and is fixed to the top end of the chassis through a leaf spring;
   the pulse electromagnet is mounted at the bottom end of the cylindrical hopper and is configured to drive the cylindrical hopper to generate torsion pendulum vibration in the vertical direction through the leaf spring;
   the ascending rail is spirally fixed to the inner wall of the cylindrical hopper, and the baffle plate is located above the ascending rail; and
   wherein the cylindrical hopper is configured such that when the cylindrical hopper vibrates, the waste mobile phones spirally ascend along the ascending rail, and the baffle plate enables at least two stacked waste mobile phones to be scattered.

3. The automatic identification and classification production line for waste mobile phones according to claim 2, wherein the automatic separation feeding device is configured to orient the waste mobile phones such that the short edges of the waste mobile phones ascend to a discharge hole in the top of the cylindrical hopper in the rail direction of the ascending rail, and the short-edge lengths of the waste mobile phones are smaller than the width of the ascending rail.

4. The automatic identification and classification production line for waste mobile phones according to claim 3, wherein the automatic separation feeding device comprises:
   a first conveying belt, a rotating rod, a cross, a connecting rod and an electric swing rod;
   side plates are arranged on the two opposite sides of the first conveying belt, a separation channel is formed between the two side plates, the width of the separation channel is larger than the wide-edge lengths of the waste mobile phones, and the separation channel is configured to receive the waste mobile phones discharged from the discharge hole;
   a first strip-shaped hole and a second strip-shaped hole which are located on the same horizontal plane and separated from each other are formed in one of the side plates;
   the rotating rod is located on one side of the first strip-shaped hole, and four circular bayonets located on the same circumference at equal intervals are formed in the side wall of the rotating rod;
   the cross is mounted on the rotating rod, and four ends of the cross can sequentially pass through the first strip-shaped hole when the rotating rod rotates;
   the electric swing rod is L-shaped, one end of the electric swing rod passes through the second strip-shaped hole, and the other end of the electric swing rod serves as a rotation driving end;
   one end of the connecting rod is connected to the swing section of the electric swing rod such that when one end of the electric swing rod is vertical to the separation channel, the connecting rod can abut against one circular bayonet, so that the rotating rod cannot rotate; and such that when the swing section of the electric swing rod swings in the direction away from the rotating rod, the connecting rod is disengaged from the rotating rod, and the rotating rod and the cross rotate by 90 degrees under the pushing effect of the waste mobile phones, so that the other circular bayonet is aligned with the connecting rod.

5. The automatic identification and classification production line for waste mobile phones according to claim 4, wherein the data acquisition device further comprises:
   an acquisition frame and a camera;
   the separation channel passes through the acquisition frame, and the acquisition frame is located between the cross and the electric swing rod;
   the camera is mounted on the acquisition frame and is configured to shoot the waste mobile phones located on the separation channel; and
   the computer identification device is configured to acquire the size information of the corresponding waste mobile phone according to a mobile phone image shot by the camera.

6. The automatic identification and classification production line for waste mobile phones according to claim 5, wherein the conveying chain further comprises:
   a plurality of groups of supporting columns corresponding to the transparent boxes respectively;
   the annular chain is provided with a plurality of mounting bases corresponding to the multiple groups of supporting columns respectively;
   the same end of each group of supporting columns is fixed to the corresponding mounting base, and the same other end of each group of supporting columns is connected with the corresponding transparent box such that when each transparent box passes through the area between the two plane mirrors, the contact faces of the corresponding supporting columns and the corresponding mounting bases are close to the ends, close to each other, of the two plane mirrors.

7. The automatic identification and classification production line for waste mobile phones according to claim 1, wherein the conveying device comprises
   a second conveying belt, two guide plates, a conveying plate and two limiting plates;
   the second conveying belt is horizontally arranged, and one end of the second conveying belt is configured to receive the waste mobile phones falling off from the conveying chain;
   the two guide plates are mounted above the conveying belt and form a narrowing channel from one end of the second conveying belt to the other end of the second conveying belt;
   the conveying plate is configured to receive the waste mobile phones falling off from the narrowing channel and convey the waste mobile phones to the classified storage device; and
   the two limiting plates are mounted on the two opposite sides of the conveying plate respectively, and the distance between the two limiting plates is smaller than the long-edge lengths of the waste mobile phones and larger than the short-edge lengths of the waste mobile phones.

8. The automatic identification and classification production line for waste mobile phones according to claim 7, wherein:
   the classified storage device comprises a rotation driving mechanism, a rotating cylinder, a plurality of storage boxes, a plurality of transverse rods corresponding to the storage boxes respectively, a plurality of telescopic rods corresponding to the transverse rods respectively and a plurality of storage tanks;

the rotation driving mechanism is configured to drive the rotating cylinder to rotate;

the transverse rods are distributed at equal intervals, the same ends of the transverse rods are movably mounted on the side wall of the rotating cylinder, and the other ends of the transverse rods are connected with the storage boxes respectively; the top end of each storage box is an open end, and a notch is formed in the side, facing the corresponding storage box, of each material storage box;

the bottom end of the conveying plate faces the opening end of one of the storage boxes, and the storage boxes are configured to receive the waste mobile phones falling off from the conveying plate;

the classified storage device is configured to firstly drive the rotating cylinder to rotate by a preset angle through the rotation driving mechanism according to the identification and classification results, so that the storage boxes are located above the storage tanks corresponding to the waste mobile phones, and then drive the telescopic rods to retract, so that the notches face the storage tanks, and finally, after the waste mobile phones fall into the storage tanks, drive the telescopic rods to stretch out, so that all storage boxes are located on the same horizontal plane.

9. The automatic identification and classification production line for waste mobile phones according to claim 8, wherein:

the number of the storage tanks is the same as that of the storage boxes;

the classified storage device further comprises a plurality of counting sensors corresponding to the storage tanks respectively; and each counting sensor is mounted on the inner wall of the corresponding storage tank and is configured to count the waste mobile phones entering the corresponding storage tank.

10. An automatic identification and classification method for waste mobile phones, applied to an automatic identification and classification production line for waste mobile phones according to claim 1, comprising the following steps:

when the annular chain rotates, enabling each transparent box to pass through an area between the two plane mirrors, so that one of the front surface and the back surface of each waste mobile phone in the corresponding transparent box is located in a shooting area of the video camera, and enabling the other surface of each waste mobile phone to penetrate through the bottom of the corresponding transparent box, to be imaged by the two plane mirrors and then to appear on the same shooting surface of the video camera together with one of the front surface and the back surface;

firstly extracting feature information of each waste mobile phone according to front and back images, shot by the video camera, of the waste mobile phones and then carrying out identification and classification on each waste mobile phone according to the feature information; and classifying and storing the waste mobile phones conveyed by the conveying device according to the types of the mobile phones on the basis of identification and classification results of the computer identification device.

11. The automatic identification and classification method for waste mobile phones according to claim 10, wherein the feeding device comprises a cylindrical hopper, a pulse electromagnet, a baffle plate, an ascending rail and a chassis; the cylindrical hopper is used for accommodating a plurality of waste mobile phones and is fixed to the top end of the chassis through a leaf spring;

the pulse electromagnet is mounted at the bottom end of the cylindrical hopper and is used for driving the cylindrical hopper to generate torsion pendulum vibration in the vertical direction through the leaf spring;

the ascending rail is spirally fixed to the inner wall of the cylindrical hopper, and the baffle plate is located above the ascending rail such that when the cylindrical hopper vibrates, the waste mobile phones spirally ascend along the ascending rail, and the baffle plate enables at least two stacked waste mobile phones to be scattered.

12. The automatic identification and classification method for waste mobile phones according to claim 11, wherein the short edges of the waste mobile phones ascend to a discharge hole in the top of the cylindrical hopper in the rail direction of the ascending rail, and the short-edge lengths of the waste mobile phones are smaller than the width of the ascending rail.

13. The automatic identification and classification method for waste mobile phones according to claim 12, wherein the automatic separation feeding device comprises:

a first conveying belt, a rotating rod, a cross, a connecting rod and an electric swing rod;

side plates are arranged on the two opposite sides of the first conveying belt, a separation channel is formed between the two side plates, the width of the separation channel is larger than the wide-edge lengths of the waste mobile phones, and the separation channel is used for receiving the waste mobile phones discharged from the discharge hole;

a first strip-shaped hole and a second strip-shaped hole which are located on the same horizontal plane and separated from each other are formed in one of the side plates;

the rotating rod is located on one side of the first strip-shaped hole, and four circular bayonets located on the same circumference at equal intervals are formed in the side wall of the rotating rod;

the cross is mounted on the rotating rod, and four ends of the cross can sequentially pass through the first strip-shaped hole when the rotating rod rotates;

the electric swing rod is L-shaped, one end of the electric swing rod passes through the second strip-shaped hole, and the other end of the electric swing rod serves as a rotation driving end;

one end of the connecting rod is connected to the swing section of the electric swing rod; when one end of the electric swing rod is vertical to the separation channel, the connecting rod can abut against one circular bayonet, so that the rotating rod cannot rotate;

when the swing section of the electric swing rod swings in the direction away from the rotating rod, the connecting rod is disengaged from the rotating rod, and the rotating rod and the cross rotate by 90 degrees under the pushing effect of the waste mobile phones, so that the other circular bayonet is aligned with the connecting rod.

14. The automatic identification and classification method for waste mobile phones according to claim 13, wherein the data acquisition device further comprises:

an acquisition frame and a camera; the separation channel passes through the acquisition frame, and the acquisition frame is located between the cross and the electric swing rod;

the camera is mounted on the acquisition frame and is used for shooting the waste mobile phones located on the separation channel; and the computer identification device is used for acquiring the size information of the corresponding waste mobile phone according to a mobile phone image shot by the camera.

15. The automatic identification and classification method for waste mobile phones according to claim 14, wherein the conveying chain further comprises:

a plurality of groups of supporting columns corresponding to the transparent boxes respectively;

the annular chain is provided with a plurality of mounting bases corresponding to the multiple groups of supporting columns respectively;

the same end of each group of supporting columns is fixed to the corresponding mounting base, and the same other end of each group of supporting columns is connected with the corresponding transparent box; and wherein, when each transparent box passes through the area between the two plane mirrors, the contact faces of the corresponding supporting columns and the corresponding mounting bases are close to the ends, close to each other, of the two plane mirrors.

16. The automatic identification and classification method for waste mobile phones according to claim 10, wherein the conveying device comprises:

a second conveying belt, two guide plates, a conveying plate and two limiting plates;

the second conveying belt is horizontally arranged, and one end of the second conveying belt is used for receiving the waste mobile phones falling off from the conveying chain;

the two guide plates are mounted above the conveying belt and form a narrowing channel from one end of the second conveying belt to the other end of the second conveying belt;

the conveying plate is used for receiving the waste mobile phones falling off from the narrowing channel and conveying the waste mobile phones to the classified storage device; and the two limiting plates are mounted on the two opposite sides of the conveying plate respectively, and the distance between the two limiting plates is smaller than the long-edge lengths of the waste mobile phones and larger than the short-edge lengths of the waste mobile phones.

17. The automatic identification and classification method for waste mobile phones according to claim 16, wherein the classified storage device comprises:

a rotation driving mechanism, a rotating cylinder, a plurality of storage boxes, a plurality of transverse rods corresponding to the storage boxes respectively, a plurality of telescopic rods corresponding to the transverse rods respectively and a plurality of storage tanks;

the rotation driving mechanism is used for driving the rotating cylinder to rotate; the transverse rods are distributed at equal intervals, the same ends of the transverse rods are movably mounted on the side wall of the rotating cylinder, and the other ends of the transverse rods are connected with the storage boxes respectively;

the top end of each storage box is an open end, and a notch is formed in the side, facing the corresponding storage box, of each material storage box;

the bottom end of the conveying plate faces the opening end of one of the storage boxes, and the storage boxes are used for receiving the waste mobile phones falling off from the conveying plate; the classified storage device firstly drives the rotating cylinder to rotate by a preset angle through the rotation driving mechanism according to the identification and classification results, so that the storage boxes are located above the storage tanks corresponding to the waste mobile phones, and then the telescopic rods are driven to retract, so that the notches face the storage tanks, and finally, after the waste mobile phones fall into the storage tanks, the telescopic rods are driven to stretch out, so that all storage boxes are located on the same horizontal plane.

18. The automatic identification and classification method for waste mobile phones according to claim 17, wherein:

the number of the storage tanks is the same as that of the storage boxes; the classified storage device further comprises a plurality of counting sensors corresponding to the storage tanks respectively; and each counting sensor is mounted on the inner wall of the corresponding storage tank and is used for counting the waste mobile phones entering the corresponding storage tank.

* * * * *